United States Patent
Ando (10) Patent No.: US 12,306,074 B2
(45) Date of Patent: May 20, 2025

(54) LIQUID WASTE MONITORING DEVICE

(71) Applicant: SHIMADZU CORPORATION, Kyoto (JP)

(72) Inventor: Shotaro Ando, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 883 days.

(21) Appl. No.: 16/969,057

(22) PCT Filed: Aug. 31, 2018

(86) PCT No.: PCT/JP2018/032319
§ 371 (c)(1),
(2) Date: Aug. 11, 2020

(87) PCT Pub. No.: WO2019/176136
PCT Pub. Date: Sep. 19, 2019

(65) Prior Publication Data
US 2021/0033501 A1 Feb. 4, 2021

(30) Foreign Application Priority Data
Mar. 14, 2018 (JP) .................................. 2018-046900

(51) Int. Cl.
*G01N 1/18* (2006.01)
*G01N 30/02* (2006.01)
*G01N 30/16* (2006.01)

(52) U.S. Cl.
CPC ............... *G01N 1/18* (2013.01); *G01N 30/16* (2013.01); *G01N 2030/027* (2013.01)

(58) Field of Classification Search
CPC ..... G01N 1/18; G01N 30/16; G01N 2030/027
(Continued)

(56) References Cited

U.S. PATENT DOCUMENTS
2015/0233875 A1  8/2015  Takahashi

FOREIGN PATENT DOCUMENTS
CN  104865318 A  8/2015
JP  05-172824 A  7/1993
(Continued)

OTHER PUBLICATIONS

International Search Report with respect to International Patent Application No. PCT/JP2018/032319, mailed Nov. 13, 2018.
(Continued)

*Primary Examiner* — Peter J MacChiarolo
*Assistant Examiner* — Rodney T Frank
(74) *Attorney, Agent, or Firm* — Renner, Otto, Boisselle & Sklar, LLP (57) ABSTRACT

Liquid waste is temporarily received by a liquid waste receiver that is provided on a discharge path for liquid waste generated in an analyzer to a liquid waste tank. An outflow liquid receiver is arranged adjacent to the liquid waste receiver, the liquid waste receiver and the outflow liquid receiver are partitioned by a partition having a certain height, and a liquid sensor is arranged in the outflow liquid receiver. In a case where an abnormality occurs in discharging of the liquid waste, the liquid waste accumulated in the liquid waste receiver flows over the partition to flow into the outflow liquid receiver, and is detected by the liquid sensor. Because the liquid waste flows into the outflow liquid receiver only in a case where an abnormality occurs in discharging of the liquid waste, an abnormality in discharging of the liquid waste can be detected by the liquid sensor.

10 Claims, 8 Drawing Sheets

(58) Field of Classification Search
USPC .......................................................... 73/61.5
See application file for complete search history.

(56) References Cited

FOREIGN PATENT DOCUMENTS

| | | |
|---|---|---|
| JP | 11-142336 A | 5/1999 |
| JP | 2014-002099 A | 1/2014 |
| JP | 2015-155837 A | 8/2015 |
| JP | 2016-003967 A | 1/2016 |

OTHER PUBLICATIONS

Written Opinion of the International Searching Authority with respect to International Patent Application No. PCT/JP2018/032319 (English Machine Translation), mailed Nov. 13, 2018.
Office Action for corresponding Chinese Patent Application No. 201880089059.9, issued Aug. 31, 2022, with English machine translation.
Office Action for corresponding Chinese Patent Application No. 201880089059.9, issued Mar. 3, 2023, with English machine translation.
Decision of Refusal in the counterpart Chinese patent application No. 201880089059.9 dated Aug. 1, 2023, with English machine translation of same.

LIQUID WASTE MONITORING DEVICE

TECHNICAL FIELD

The present invention relates to a liquid waste monitoring device for monitoring a liquid waste generated in an analysis system for carrying out an analysis using liquid such as liquid chromatography.

BACKGROUND ART

A liquid chromatographic system is constituted by a combination of a plurality of analyzers such as a liquid sending device for sending a mobile phase, an autosampler for injecting a sample into an analysis flow path through which the mobile phase sent from the liquid sending device flows, a column oven having a separation column for separating the sample injected by the autosampler and a detector for detecting a sample component into which the sample is separated in the separation column.

In such an analysis system, the respective elements constituting the analysis flow path are connected to one another by a tube, and the pressure in the flow path becomes high. Thus, liquid might leak from a connection portion of the tube or the like. In a case where a liquid leak occurs, an electrical component in the analyzer might malfunction due to a leak liquid, or an analyst might become poisoned by a leaked organic solvent. Therefore, in general, a receiver that receives a leak liquid is arranged in each analyzer at a position where a liquid leak is likely to occur, and a sensor that detects liquid is arranged in the receiver. Further, the sensor is configured to be able to detect an occurrence of a liquid leak (see Patent Document 1).

Further, in the above-mentioned analysis system, liquid such as a dehumidifying water generated in a dehumidifying cooler provided in an autosampler, etc. is generated as a liquid waste in addition to a mobile phase solvent and a cleaning liquid that have been used in an analysis. These liquid wastes are normally led by a tube to a liquid waste tank provided separately from each analyzer to be discharged from each analyzer, so that the parts in each analyzer does not become wet by the liquid wastes.

CITATION LIST

Patent Document

[Patent Document 1] JP 2015-155837 A

SUMMARY OF INVENTION

Technical Problem

For example, in a case where a liquid waste tank is left filled with a liquid waste or a tube for discharging the liquid waste is clogged, the liquid waste is not discharged properly from an analyzer, and the liquid waste leaks in the analyzer. In a case where the liquid waste leaks in the analyzer, an electrical component in the analyzer might malfunction, or an analyst might become poisoned by a leaked organic solvent. Therefore, it is desirable that an abnormality in discharging of the liquid waste is detected quickly.

However, because a liquid waste is discharged normally, even in a case where a sensor is arranged on a discharge path of the liquid waste similarly to the detection of a leak liquid, it is difficult to detect an abnormality in flow of the liquid waste.

The present invention was conceived considering the above-mentioned problems, and an object of the present invention is to enable detection of an abnormality in discharging of a liquid waste generated in an analyzer constituting an analysis system.

Solution to Problem

A liquid waste monitoring device according to the present invention includes a liquid waste receiver that is provided on a discharge path for a liquid waste supplied from at least one analyzer that constitutes an analysis system for carrying out an analysis using liquid, and is used to receive the liquid waste temporarily and discharge the liquid waste, an outflow liquid receiver that is provided with a partition provided between the outflow liquid receiver and the liquid waste receiver, and is used to receive a liquid waste that has flowed over the partition to flow out from the liquid waste receiver, and a liquid sensor that is provided in the outflow liquid receiver and is used to detect a liquid waste that has flowed out from the liquid waste receiver.

That is, in the present invention, the liquid waste generated in the analyzer is not directly discharged to a liquid waste tank but is temporarily received by the liquid waste receiver provided on the discharge path to the liquid waste tank. Then, the outflow liquid receiver is arranged adjacent to the liquid waste receiver, the liquid waste receiver and the outflow liquid receiver are partitioned by the partition having a certain height, and the liquid sensor is arranged in the outflow liquid receiver. In a case where there is no abnormality in discharging of the liquid waste, the liquid waste received by the liquid waste receiver is discharged quickly from the liquid waste receiver. On the other hand, in a case where an abnormality has occurred in discharging of the liquid waste due to clogging of the tube extending from the liquid waste receiver or the liquid waste tank being full, the liquid waste accumulates in the liquid waste receiver. In a case where a certain amount of liquid waste accumulates in the liquid waste receiver, the liquid waste flows over the partition into the outflow liquid receiver, and the liquid waste that has flowed into the outflow liquid receiver is detected by the liquid sensor. Because the liquid waste flows into the outflow liquid receiver only in a case where an abnormality has occurred in discharging of the liquid waste, the abnormality in discharging of the liquid waste can be detected by the liquid sensor.

The liquid waste receiver and the outflow liquid receiver can be provided in a common container. In that case, the partition partitioning the liquid waste receiver from the outflow liquid receiver is provided to have a height lower than that of an outer wall of the container. Thus, it is possible to detect an abnormality by the liquid sensor before the liquid waste overflows from the container in a case where an abnormality occurs in discharging of the liquid waste.

Further, the liquid waste receiver and the outflow liquid receiver may be respectively constituted by individual containers, the partition may be constituted by a wall surface of a container of the liquid waste receiver and a wall surface of a container of the outflow liquid receiver, the wall surfaces being connected to each other, and the partition may be provided to have a height lower than that of another wall surface of the container of the liquid waste receiver and that of another wall surface of the container of the outflow liquid receiver.

Further, the outflow liquid receiver may be configured to receive a leak liquid in the analyzer, and the leak liquid that has flowed into the outflow liquid receiver may be detected by the liquid sensor or a separately provided second liquid sensor. Then, the liquid sensor can have the function as a leak sensor for detecting a leak liquid in the analyzer. In this case, the leak liquid received by the outflow liquid receiver can be discharged to the liquid waste tank through the liquid waste receiver.

A plurality of liquid wastes are normally generated in the analysis system. For example, in an autosampler of a liquid chromatograph system, a cleaning liquid used for cleaning a sampling needle, a dehumidifying water generated in a dehumidifying cooler, etc. are generated as a liquid waste. In the present invention, the device may be configured such that a plurality of these liquid wastes can be received by a common liquid waste receiver. Then, the configuration of the device is simplified, and the cost can be reduced.

Meanwhile, a plurality of the liquid waste receivers may be provided, and the device may be configured such that the plurality of liquid waste receivers that are different from one another receive a plurality of different liquid wastes. In that case, it is possible to separate discharge destinations depending on the properties of liquid wastes such as a liquid waste including an organic solvent and a liquid waste not including an organic solvent, for example, by connecting the plurality of liquid waste receivers to the liquid waste tanks that are different from one another.

Even in the above-mentioned case, in a case where an abnormality occurs in discharging of a liquid waste in any of the liquid waste receivers, when the liquid waste that has flowed out from the liquid waste receiver overflows from the outflow liquid receiver, the liquid waste monitoring device is preferably configured such that the liquid waste is discharged to the liquid waste tank connected to another liquid waste receiver through the other liquid waste receiver. Then, even in a case where the liquid waste overflows from the outflow liquid receiver, malfunction or the like caused by the overflowing liquid waste wetting inside of the analyzer can be prevented.

In a preferred embodiment, the partitions between each of the plurality of liquid waste receivers and the outflow liquid receiver have different heights.

Further, the liquid waste monitoring device is preferably configured such that a liquid waste that has flowed into the outflow liquid receiver is discharged to a liquid waste tank.

The analysis system includes an analysis system for carrying out liquid chromatography. In this case, the liquid waste receiver and the outflow liquid receiver can be provided in an autosampler that is the one analyzer that constitutes the analysis system. The liquid waste receiver and the outflow liquid receiver may be provided in an analyzer other than an autosampler.

Advantageous Effects of Invention

In the liquid waste monitoring device according to the present invention, the liquid waste is received by the liquid waste receiver provided on the path to the liquid waste tank, and the liquid sensor is arranged in the outflow liquid receiver that is provided to be adjacent to the liquid waste receiver with the partition provided therebetween. Thus, an abnormality in discharging of the liquid waste can be detected by the liquid sensor.

DESCRIPTION OF EMBODIMENTS

Embodiments of a liquid waste monitoring device will be described below with reference to the drawings.

Figure 1:
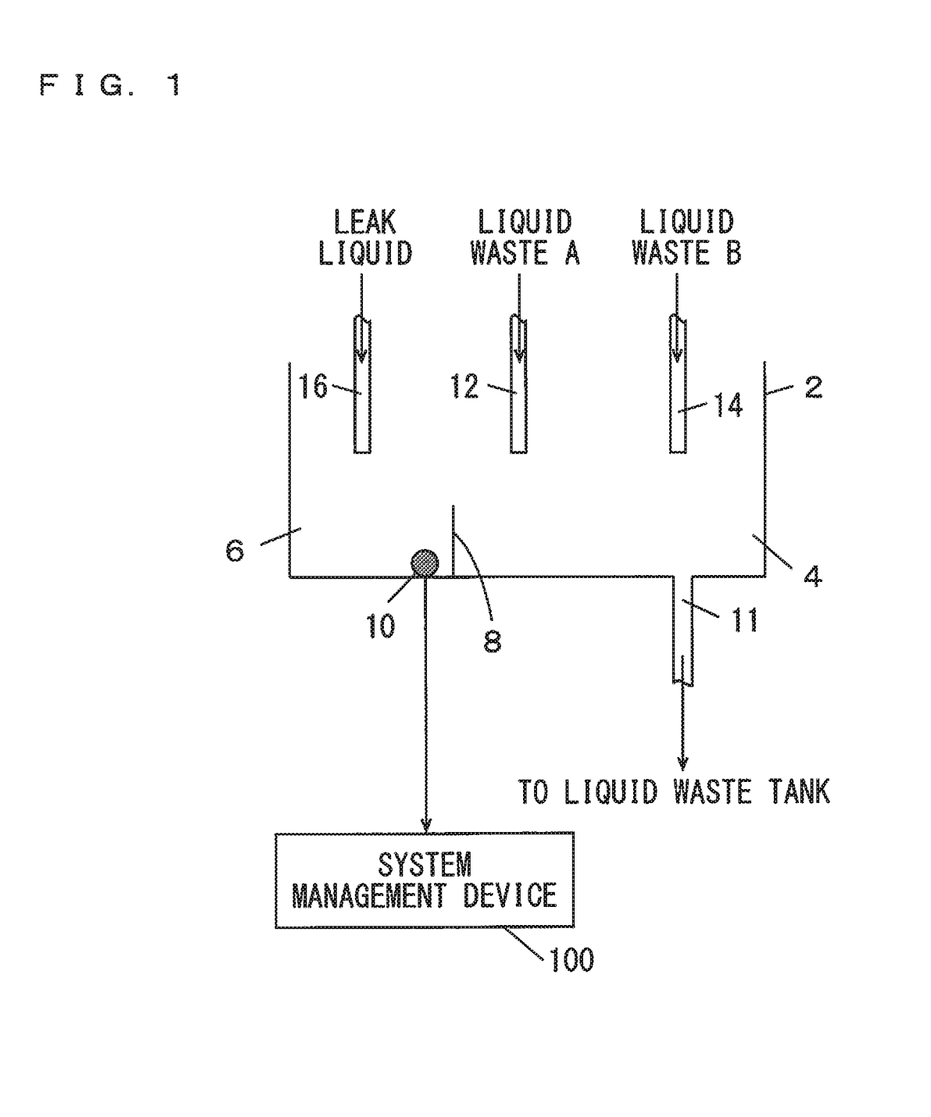
FIG. 1 A schematic diagram showing the configuration of one inventive example of a liquid waste monitoring device.

FIG. 1 is a schematic diagram showing the configuration of one inventive example of the liquid waste monitoring device.

The liquid waste monitoring device of this inventive example includes a liquid waste receiver 4, an outflow liquid receiver 6, a partition 8 and a liquid sensor 10. The liquid waste receiver 4 and the outflow liquid receiver 6 are the sections partitioned by the partition 8 in a common container 2. The partition 8 is provided to have a height lower than that of the outer wall of the container 2.

The ends of flow paths 12, 14 for a liquid waste generated in an analyzer (an autosampler, for example) that constitutes an analysis system are arranged above the liquid waste receiver 4, and liquid wastes A, B that drop from the ends of the flow paths 12, 14 are received by the liquid waste receiver 4. The liquid wastes A, B are a cleaning liquid used for cleaning a sampling needle and a dehumidifying water generated in a dehumidifying cooler, for example. The liquid waste receiver 4 communicates with a liquid waste tank through a discharge tube 11, and is configured such that the liquid wastes A, B received by the liquid waste receiver 4 are discharged to the liquid waste tank through the discharge tube 11. That is, the liquid waste receiver 4 is used to temporarily receive the liquid waste generated in the analyzer on the discharge path to being discharged to the liquid waste tank.

While the two types of liquid wastes A, B are received by the liquid waste receiver 4 in this inventive example, only one type of liquid waste, or three or more types of liquid wastes may be received by the liquid waste receiver 4.

The end of a flow path 16 for a leak liquid generated in the analyzer is arranged above the outflow liquid receiver 6, and the leak liquid that drops from the end of the flow path 16 is received by the outflow liquid receiver 6.

The liquid sensor 10 is provided in the outflow liquid receiver 6 and can detect the liquid that has flowed into the outflow liquid receiver 6. The liquid sensor 10 provided in the outflow liquid receiver 6 has both of the function as a leak sensor for detecting a leak liquid and the function as a liquid waste sensor for detecting an abnormality in discharging of a liquid waste. For example, the liquid sensor 10 can be realized by a float sensor, an ultrasonic sensor, a weight sensor or the like in addition to a capacitance sensor and an inter-electrode resistance detection sensor.

Figure 2:
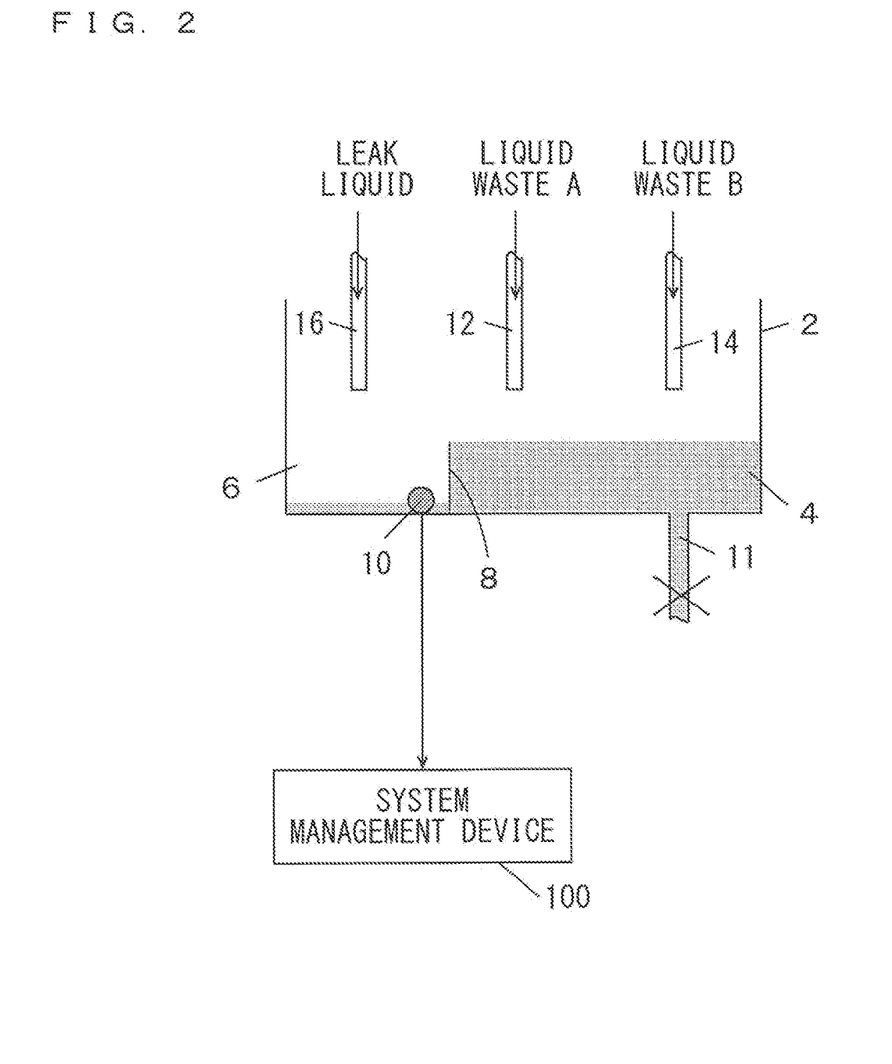
FIG. 2 A diagram showing the state of a liquid waste when an abnormality occurs in discharging of the liquid waste in the same inventive example.

An abnormality in discharging of a liquid waste refers to the liquid waste not flowing or having difficulty in flowing from the liquid waste receiver 4 to the liquid waste tank due to clogging of the discharge tube 11 or the liquid waste tank being full. In a case where an abnormality occurs in discharging of a liquid waste, the liquid waste accumulates in the liquid waste receiver 4 as shown in FIG. 2, and the liquid waste that has overflowed from the liquid waste receiver 4 flows over the partition 8 to flow into the outflow liquid receiver 6 and is detected by the liquid sensor 10.

In this inventive example, an output signal of the liquid sensor 10 is transmitted to a system management device 100 that manages an operation of the analysis system. In a case where an analysis continues with an abnormality present in discharging of a liquid waste, the liquid waste continues to accumulate in the container 2 and eventually flows out from the container 2 to the outside. In order to avoid such a situation, in a case where an abnormality occurs in discharging of a liquid waste, the system management device 100 that has received an output signal from the liquid sensor 10 preferably stops an analysis operation in the analysis system or provides warning to a user.

Figure 3:
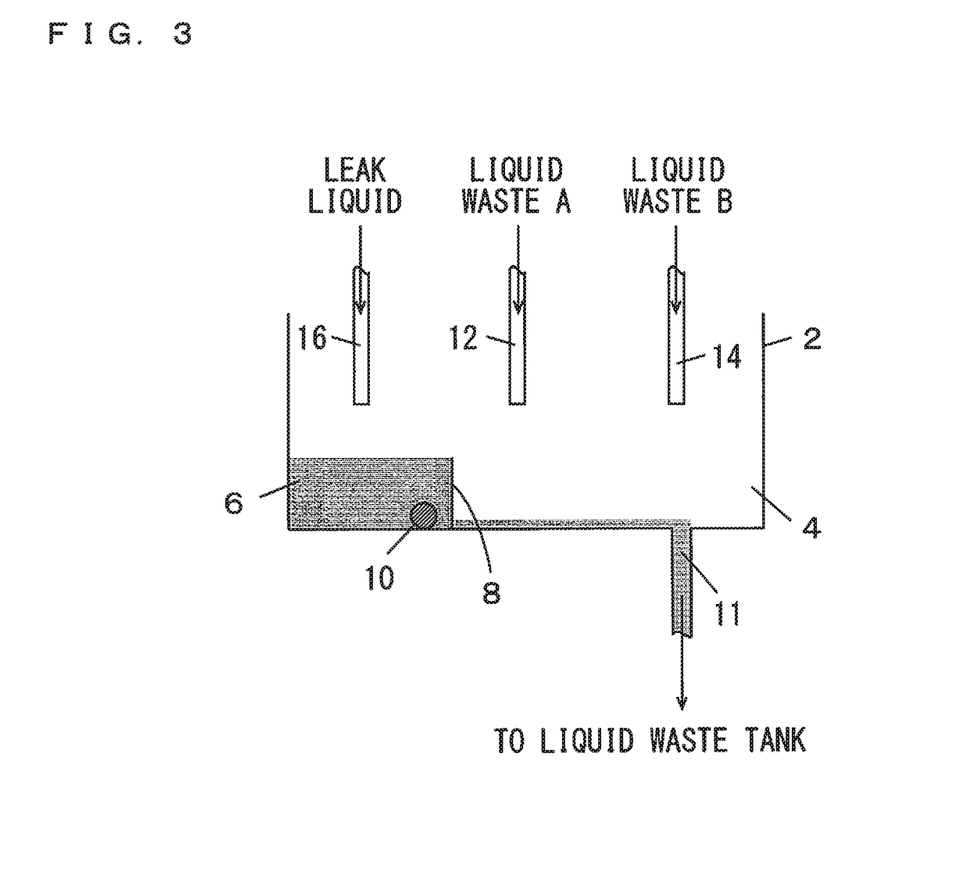
FIG. 3 A diagram showing a flow of a leak liquid when the leak liquid is generated in the same inventive example.

Further, because the outflow liquid receiver 6 is not connected to the liquid waste tank, a leak liquid continues to accumulate in the outflow liquid receiver 6 when a liquid leak occurs in the analyzer. However, the leak liquid that has overflowed from the outflow liquid receiver 6 flows into the liquid waste receiver 4 and is discharged to the liquid waste tank through the discharge tube 11 as shown in FIG. 3. Thus, the leak liquid does not overflow from the container 2.

While the liquid sensor 10 is configured to be able to detect a liquid leak due to dropping of a leak liquid to the outflow liquid receiver 6 in the above-mentioned inventive example, the present invention is not limited to this. A leak sensor for detecting a leak liquid may be provided as a second liquid sensor in addition to the liquid sensor 10.

While the liquid waste receiver 4 and the outflow liquid receiver 6 are constituted by one common container in the above-mentioned inventive example, the present invention is not limited to this. The liquid waste receiver 4 and the outflow liquid receiver 6 may be constituted by containers individually and respectively, and connected to each other. In this case, the partition is constituted by the wall surface of the container of the liquid waste receiver 4 and the wall surface of the container of the outflow liquid receiver 6, the wall surfaces being connected to each other. The partition is provided to have a height lower than that of the other wall surface of the container of the liquid waste receiver 4 and that of the other wall surface of the container of the outflow liquid receiver 6.

While a discharge tube is not provided in the outflow liquid receiver 6 in the above-described embodiment, the present invention is not limited to this. The outflow liquid receiver 6 may be connected to the liquid waste tank through a discharge tube. In this case, a leak liquid and a liquid waste accumulated in the outflow liquid receiver 6 can be discharged to the liquid waste tank through the discharge tube connected to the outflow liquid receiver 6.

These modifications can be applied respectively to inventive examples described below.

While the common liquid waste receiver 4 is configured to receive the plurality of types of liquid wastes A, B in the above-mentioned inventive example, the liquid wastes may be received by different liquid waste receivers depending on the types of liquid wastes.

Figure 4:
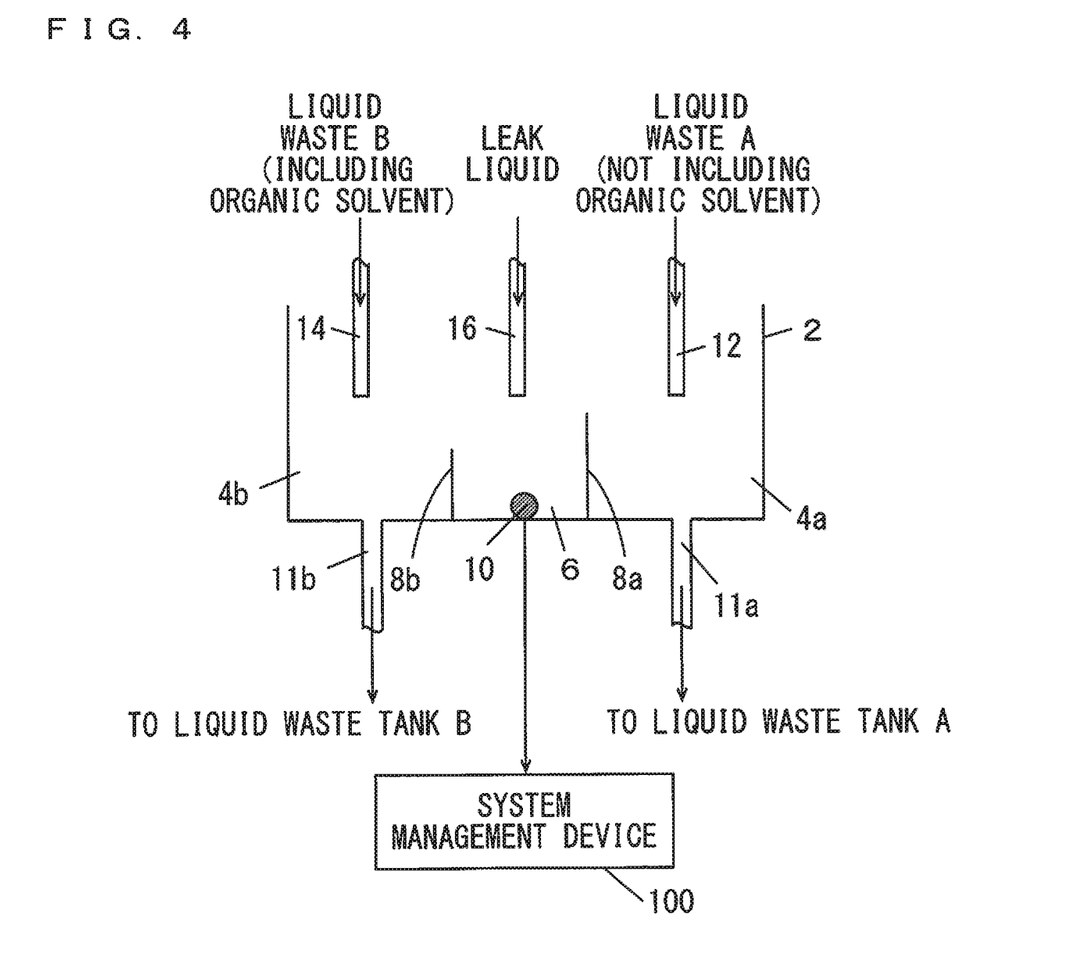
FIG. 4 A schematic diagram showing the configuration of another inventive example of a liquid waste monitoring device.

FIG. 4 is a schematic diagram showing the configuration of an inventive example in which different types of liquid wastes are received by different liquid waste receivers.

In this inventive example, a liquid waste receiver 4a for receiving a liquid waste A that drops from a flow path 12, a liquid waste receiver 4b for receiving a liquid waste B that drops from a flow path 14 and an outflow liquid receiver 6 are provided in a container 2. The liquid waste receiver 4a is adjacent to the outflow liquid receiver 6 via a partition 8a, and the liquid waste receiver 4b is adjacent to the outflow liquid receiver 6 via a partition 8b. A liquid sensor 10 is provided in the outflow liquid receiver 6. A leak liquid that drops from a flow path 16 is received by the outflow liquid receiver 6, and the liquid sensor 10 is configured to detect a liquid leak. The present invention is not limited to this, and a leak sensor for detecting a leak liquid may be provided separately from the liquid sensor 10.

The liquid waste receiver 4a communicates with a liquid waste tank A through a discharge tube 11a, and the liquid waste receiver 4b communicates with a liquid waste tank B through a discharge tube 11b. In a case where this liquid waste monitoring device is applied to a liquid chromatographic system, a liquid waste that does not include an organic solvent such as a dehumidifying water generated in a dehumidifying cooler can be referred to as a liquid waste A, and a liquid waste including an organic solvent such as a cleaning liquid used for cleaning a sampling needle can be referred to as a liquid waste B. Thus, the liquid waste A not including an organic solvent and the liquid waste B including an organic solvent can be discharged to the different liquid waste tanks A, B, and the liquid wastes can be managed easily.

The liquid sensor 10 can detect the liquid waste A that has flowed into the outflow liquid receiver 6 from the liquid waste receiver 4a and the liquid waste B that has flowed into the outflow liquid receiver 6 from the liquid waste receiver 4b in addition to a leak liquid.

Figure 5:
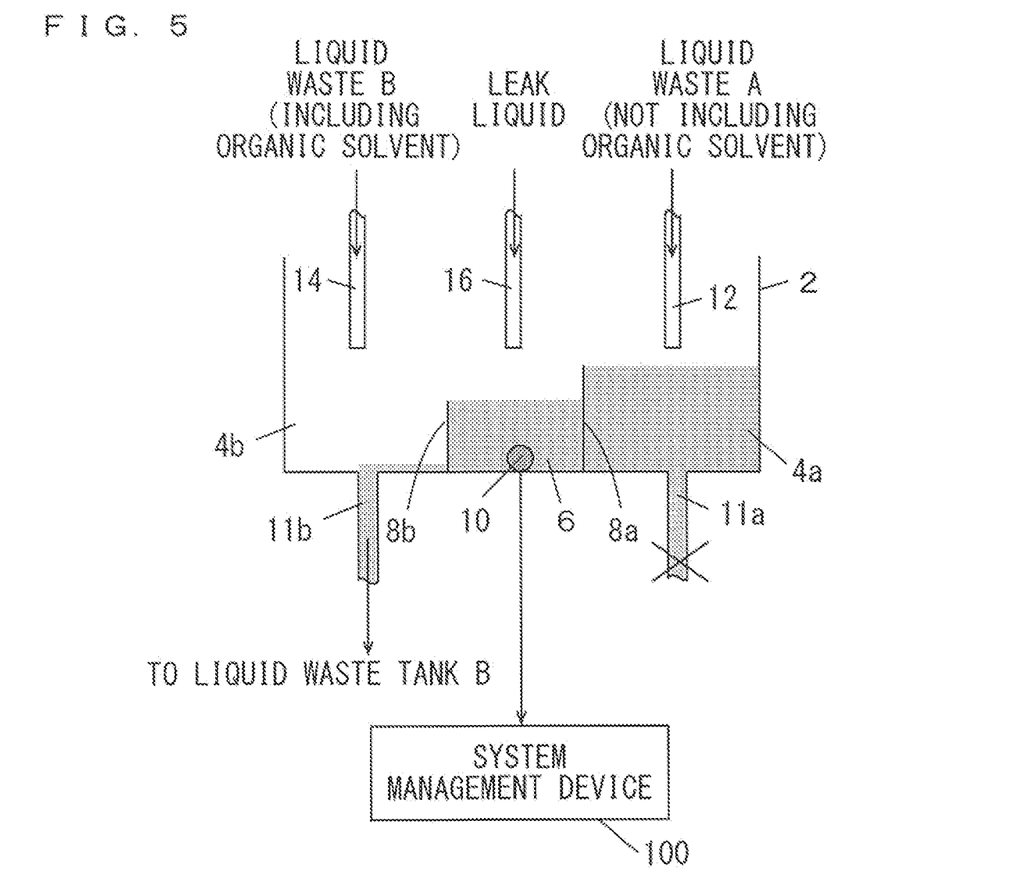
FIG. 5 A diagram showing the state of a liquid waste when an abnormality occurs in discharging of a liquid waste 1 in the same inventive example.

In a case where an abnormality has occurred in discharging of a liquid waste from the liquid waste receiver 4a to the liquid waste tank A, the liquid waste A that has overflowed from the liquid waste receiver 4a flows into the outflow liquid receiver 6 as shown in FIG. 5 and is detected by the liquid sensor 10. Even in a case where this state is maintained, because the liquid waste A that has overflowed from the outflow liquid receiver 6 flows into the liquid waste receiver 4b and is discharged to the liquid waste tank B through the discharge tube 11b, the liquid waste A does not flow out from the container 2.

Figure 6:
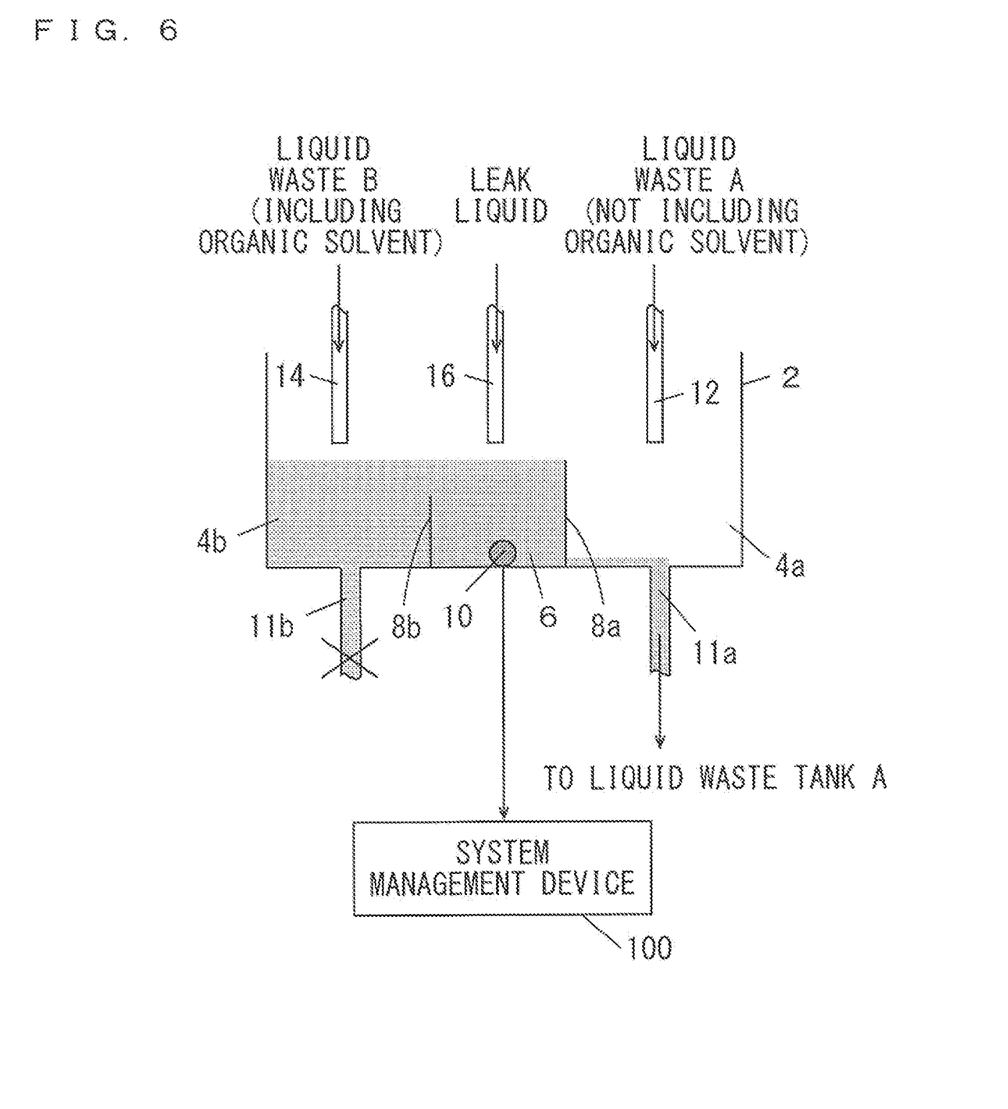
FIG. 6 A diagram showing the state of a liquid waste when an abnormality occurs in discharging of a liquid waste 2 in the same inventive example.

In a case where an abnormality has occurred in discharging of a liquid waste from the liquid waste receiver 4b to the liquid waste tank B, the liquid waste B that has overflowed from the liquid waste receiver 4b flows into the outflow liquid receiver 6 as shown in FIG. 6 and is detected by the liquid sensor 10. Even in a case where this state is maintained, because the liquid waste B that has overflowed from the outflow liquid receiver 6 flows into the liquid waste receiver 4a and is discharged to the liquid waste tank A through the discharge tube 11a, the liquid waste B does not flow out from the container 2.

Figure 7:
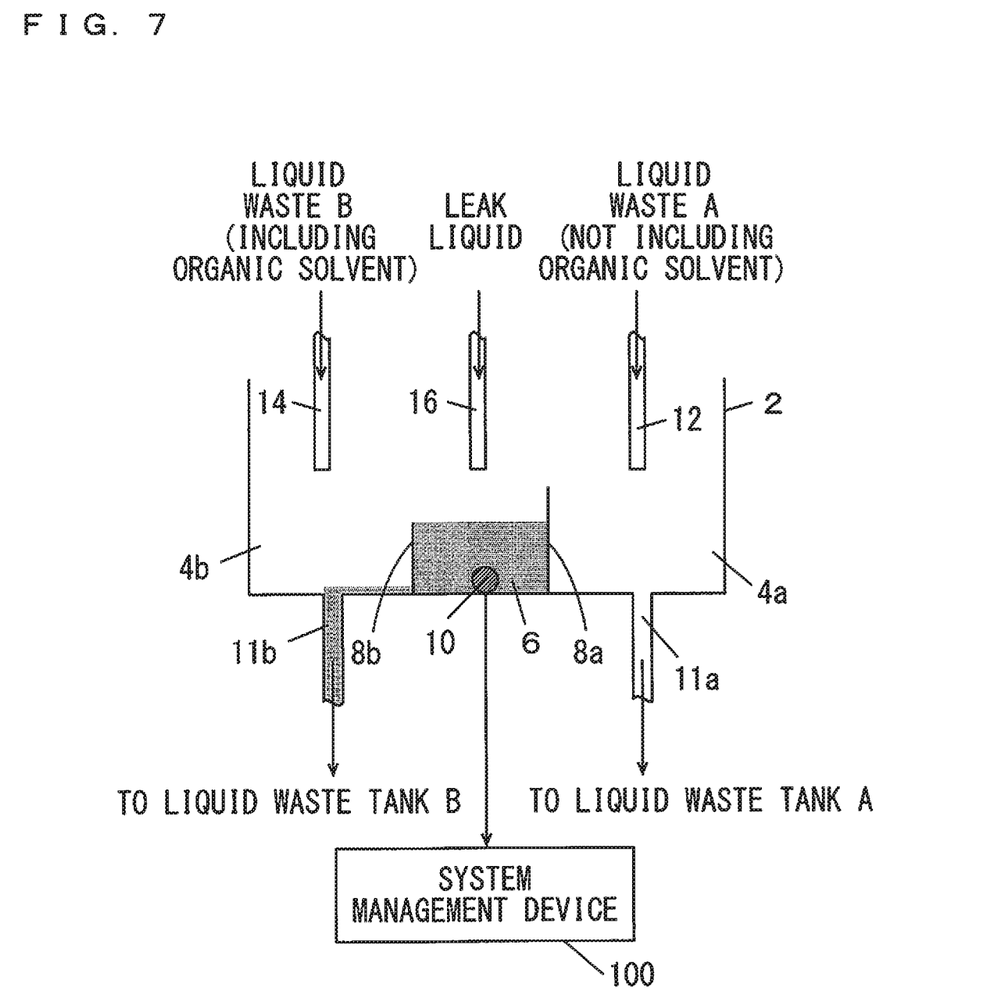
FIG. 7 A diagram showing a flow of a leak liquid when the leak liquid is generated in the same inventive example.

Further, the height of the partition 8b interposed between the liquid waste receiver 4b and the outflow liquid receiver 6 is lower than that of the partition 8a interposed between the liquid waste receiver 4a and the outflow liquid receiver 6. A leak liquid that has overflowed from the outflow liquid receiver 6 flows out to the liquid waste receiver 4b and is discharged to the liquid waste tank B. Thus, in a case where being generated, the leak liquid including an organic solvent can be prevented from flowing into in the liquid waste tank A for storing the liquid waste A not including an organic solvent.

Figure 8:
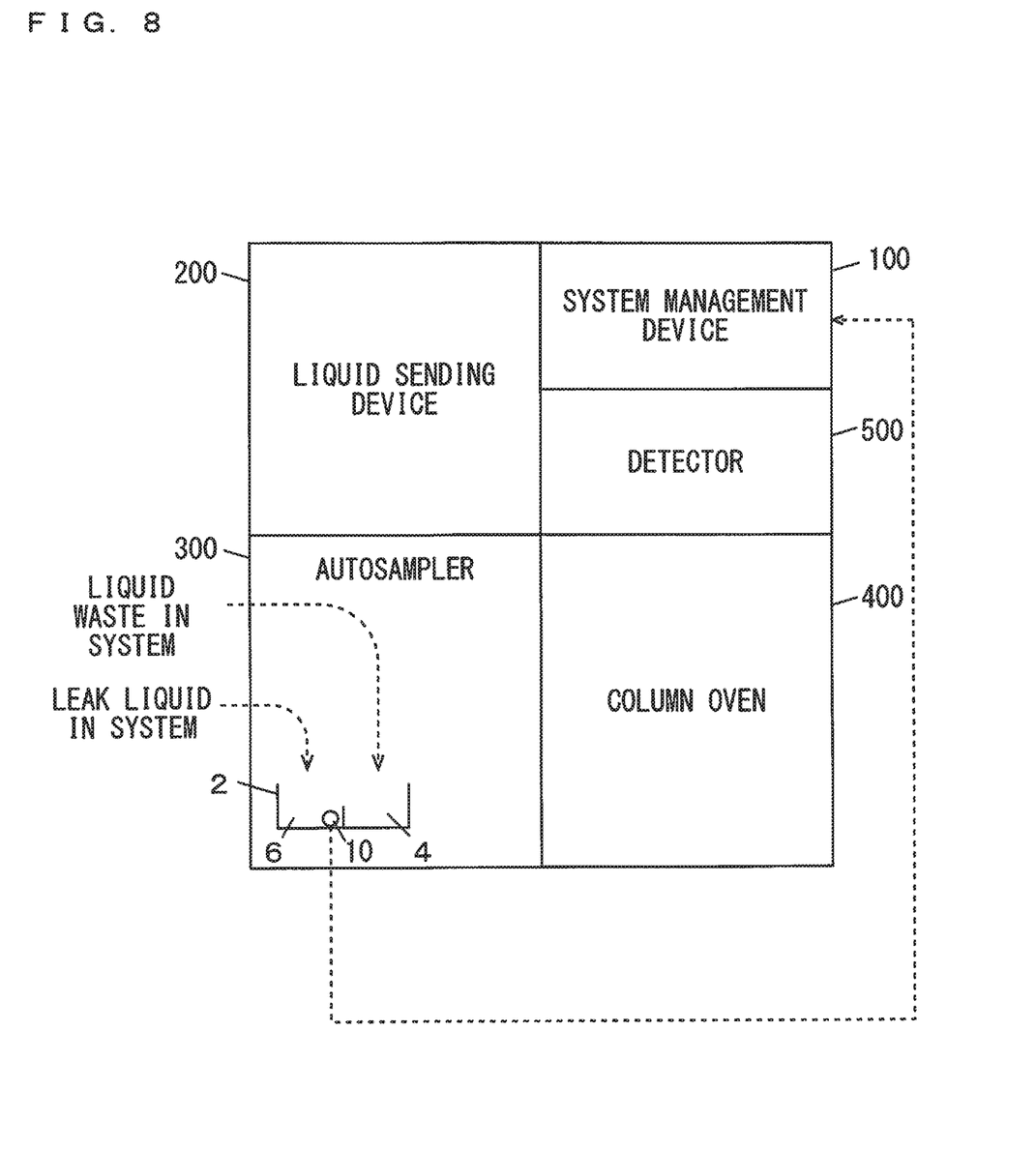
FIG. 8 A diagram showing an example of application of the liquid waste monitoring device to a liquid chromatographic system.

An example in which the above-mentioned liquid waste monitoring device is applied to a liquid chromatographic system will be described with reference to FIG. 8.

The liquid chromatographic system of this example includes a system management device 100 that manages an operation of the entire system, a liquid sending device 200 that sends a mobile phase, an autosampler 300 that automatically collects a sample and injects the sample into an analysis flow path, a column oven 400 that stores a separation column for separating the sample into components and a detector 500 for detecting sample components into which the sample is separated in the separation column, as analyzers that constitute the analysis system.

The container 2 of the liquid waste monitoring device is provided in the autosampler 300, and the liquid waste receiver 4 and the outflow liquid receiver 6 provided in the container 2 are configured to receive droplets of a liquid waste and a leak liquid generated in each analyzer that constitutes this analysis system. The liquid waste that drops into the liquid waste receiver 4 includes a mobile phase or the like that has flowed out from the detector 500 in addition to a dehumidifying water generated in a dehumidifying cooler provided in the autosampler 300 and a cleaning liquid used to clean a sampling needle. The leak liquid that drops into the outflow liquid receiver 6 is the leak liquid generated in each analyzer that constitutes this analysis system.

An output signal of the liquid sensor 10 provided in the outflow liquid receiver 6 is input to the system management device 100. When the liquid sensor 10 detects presence of a leak liquid or an abnormality in flow of a liquid waste, the system management device 100 stops an analysis operation or displays warning to the user.

With the above-mentioned configuration, not only a leak liquid generated in the analysis system can be detected by the one liquid sensor 10, but also a discharge flow of a liquid waste generated in the analysis system can be monitored by the one liquid sensor 10.

REFERENCE SIGNS LIST

2 Container
4, 4a, 4b Liquid Waste Receivers
6 Outflow Liquid Receiver
8, 8a, 8b Partitions
10 Liquid Sensor
11, 11a, 11b Discharge Tubes
12, 14, 16 Flow Paths
100 System Management Device
200 Liquid Sending Device
300 Autosampler
400 Column Oven
500 Detector

The invention claimed is:

1. A liquid waste monitoring device comprising:
a liquid waste receiver that is provided on a discharge path for a liquid waste sent from at least one analyzer that constitutes an analysis system for carrying out an analysis using liquid, and is used to receive the liquid waste temporarily and discharge the liquid waste;
an outflow liquid receiver that is provided with a partition provided between the outflow liquid receiver and the liquid waste receiver, and is used to receive a liquid waste that has flowed over the partition to flow out from the liquid waste receiver; and
a liquid sensor that is provided in the outflow liquid receiver and is used to detect a liquid waste that has flowed out from the liquid waste receiver; and
an end of a flow path for a leak liquid in the analyzer arranged above the outflow liquid receiver,
wherein
the outflow liquid receiver is configured to receive the leak liquid in the analyzer, and the leak liquid that has flowed into the outflow receiver is detected by the liquid sensor.

2. The liquid waste monitoring device according to claim 1, wherein
the liquid waste receiver and the outflow liquid receiver are sections partitioned by the partition in a common container, and the partition is provided to have a height lower than that of an outer wall of the container.

3. The liquid waste monitoring device according to claim 1, wherein
the liquid waste receiver and the outflow liquid receiver are respectively constituted by individual containers,
the partition is constituted by a wall surface of a container of the liquid waste receiver and a wall surface of a container of the outflow liquid receiver, the wall surfaces being connected to each other; and
the partition is provided to have a height lower than that of another wall surface of the container of the liquid waste receiver and that of another wall surface of the container of the outflow liquid receiver.

4. The liquid waste monitoring device according to claim 1, wherein
the common liquid waste receiver is configured to receive a plurality of liquid wastes.

5. The liquid waste monitoring device according to claim 1, wherein
a plurality of the liquid waste receivers are provided,
the plurality of the liquid waste receivers that are different from one another are configured to receive a plurality of liquid wastes, and
the plurality of the liquid waste receivers communicate with liquid waste tanks that are different from one another.

6. The liquid waste monitoring device according to claim 5, being configured such that a liquid waste that has overflowed from the outflow liquid receiver is discharged to a liquid waste tank communicating with another liquid waste receiver through the another liquid waste receiver when the liquid waste that has flowed out from any one of the liquid waste receivers overflows from the outflow liquid receiver.

7. The liquid waste monitoring device according to claim 5, wherein
the partitions between each of the plurality of liquid waste receivers and the outflow liquid receiver respectively have different heights.

8. The liquid waste monitoring device according to claim 1, being configured such that a liquid waste that has flowed into the outflow liquid receiver is discharged to a liquid waste tank.

9. The liquid waste monitoring device according to claim 1, wherein
the analysis system is an analysis system for carrying out liquid chromatography, and
the liquid waste receiver and the outflow liquid receiver are provided in an autosampler that is one analyzer that constitutes the analysis system.

10. A liquid waste monitoring device comprising:
a liquid waste receiver that is provided on a discharge path for a liquid waste sent from at least one analyzer that constitutes an analysis system for carrying out an analysis using liquid, and is used to receive the liquid waste temporarily and discharge the liquid waste;

an outflow liquid receiver that is provided with a partition provided between the outflow liquid receiver and the liquid waste receiver, and is used to receive a liquid waste that has flowed over the partition to flow out from the liquid waste receiver; and a liquid sensor that is provided in the outflow liquid receiver and is used to detect a liquid waste that has flowed out from the liquid waste receiver, wherein the outflow liquid receiver is configured to receive a leak liquid in the analyzer prior to any overflow of the leak liquid over the partition into the liquid waste receiver, and the leak liquid is detected by the liquid sensor or a separately provided second liquid sensor prior to the any overflow of the leak liquid over the partition.

* * * * *